FREDRICK C. HUNT
INVENTOR

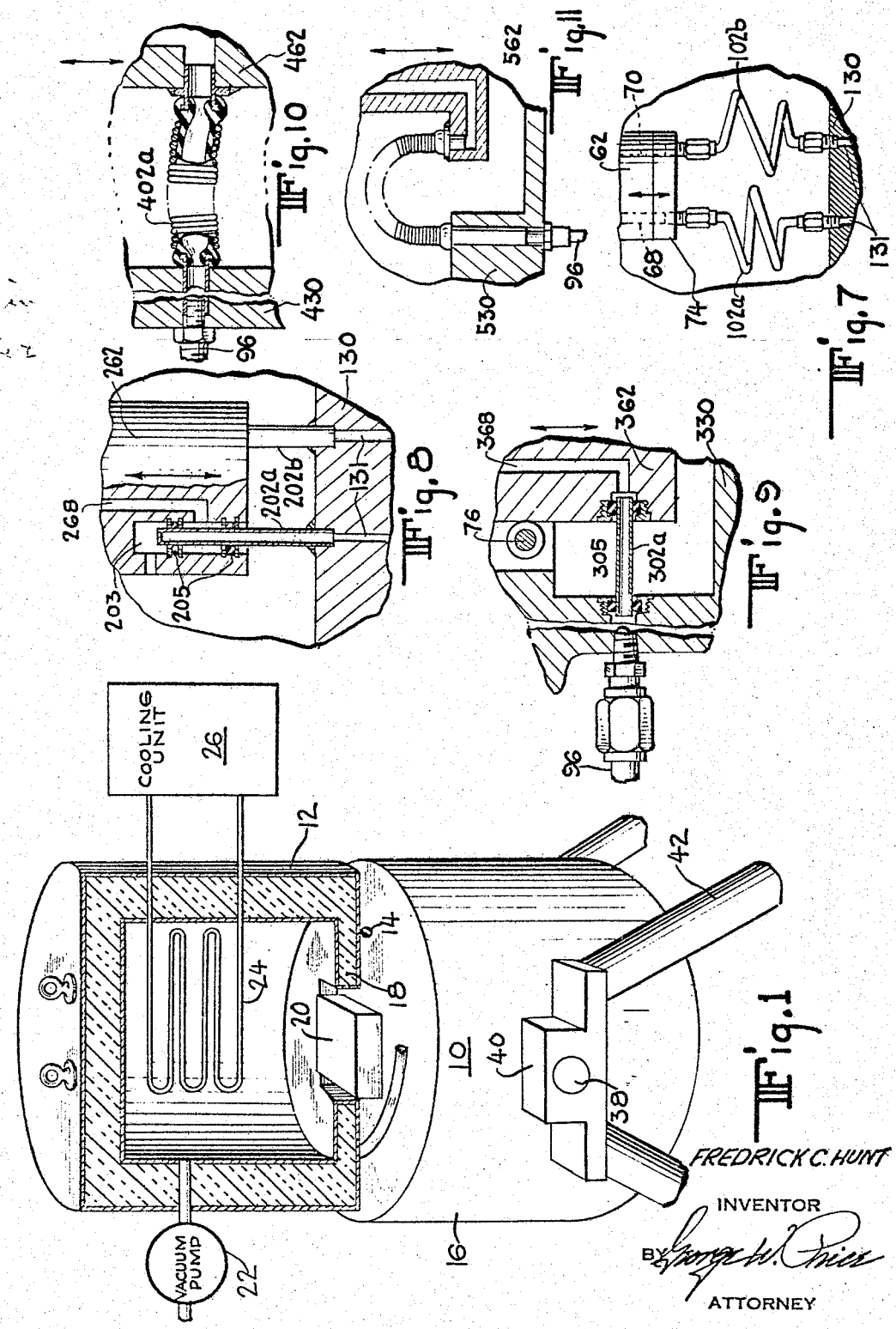

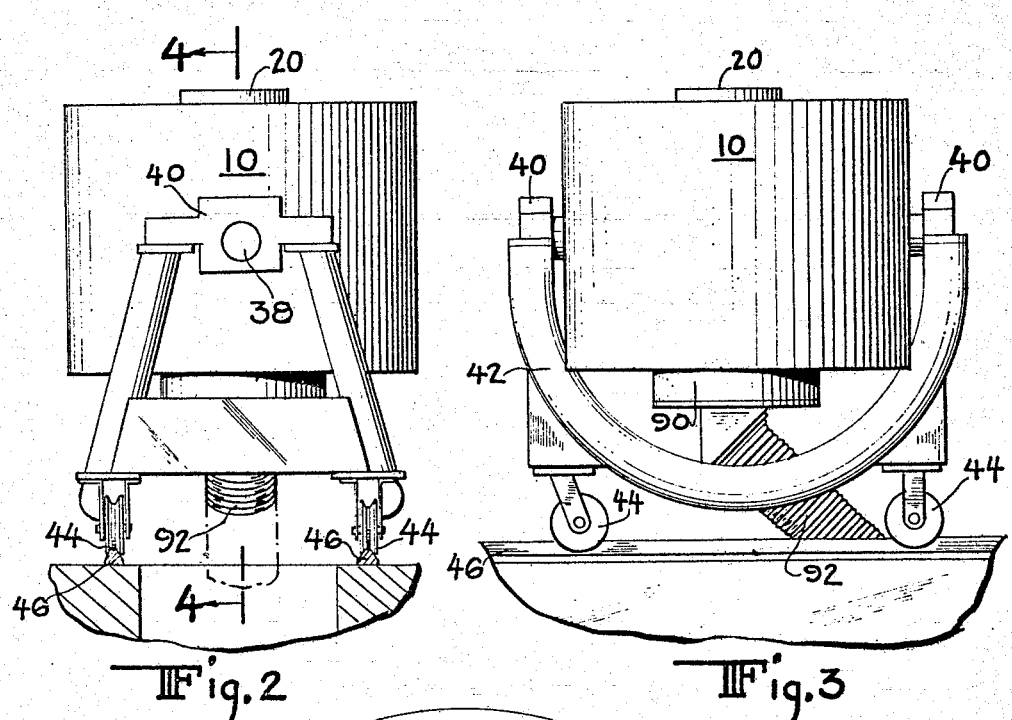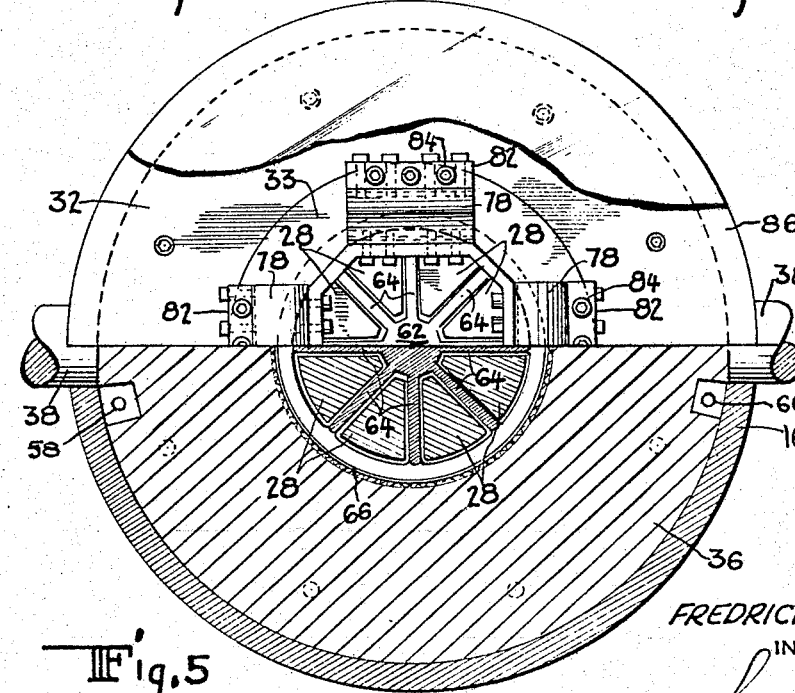

3,049,913
    ENVIRONMENTAL TEST APPARATUS
Frederick C. Hunt, Beverly, Mass., assignor, by mesne assignments, to Ling-Temco Electronics, Inc., a corporation of Delaware
        Filed Oct. 24, 1958, Ser. No. 769,417
                18 Claims. (Cl. 73—71.6)

This invention relates to environmental test apparatus of the type whereby airplane and missile components and parts or other test loads are subjected to conditions of vibration, temperature and reduced atmospheric pressure simulating those encountered under actual operating conditions.

In such environmental testing as has been performed heretofore it has been the practice to vibrate the test load or part by means of a conventional vibration generator or "shaker" such as is shown in United States Letters Patent No. 2,599,036 to Efromson et al. To simulate the effects of high altitude, both the test load and vibration generator are often completely enclosed in a hermetically sealed chamber which is evacuated and cooled. While providing satisfactory test results, such a system is inefficient and expensive to operate and construct. Because environmental test loads are usually much smaller in size as the shakers required to vibrate such loads, the altitude chamber volume and the capacities of the accessory equipment may differ by an order of magnitude depending upon whether the load alone or both load and shaker are to be housed; when allowance is made in the latter case for power and cooling connections and the space for personnel to set up and adjust the test. The greater volume of a bigger chamber not only adds to the weight and difficulty in handling but requires vacuum pumps of greater capacity and requires a longer time for evacuation so that the time required for a test setup to be made is greatly increased.

The objects of this invention are, therefore, to provide environment test apparatus and a vibration generator for use therewith which are small in size, which have a relatively high output, which are liquid cooled, which can be evacuated quickly, which require a minimum of time for changing of the test setup and which advance the art generally.

Environment test apparatus according to the present invention contemplates a vibration generator including a magnetic circuit structure in the form of a cylindrical outer shell one end of which is closed by a head to form a chamber. The magnetic circuit also includes a central pole piece which is carried at one end by the end head in coaxial relationship with respect to the shell. The inner surface of the shell abuts with a pole plate provided with an aperture whose wall encircles the pole piece and is spaced therefrom to form the air gap in the magnetic circuit. A fluid cooled field winding for establishing a unidirectional magnetic flux across the air gap is located in the chamber. The winding is preferably formed of a plurality of turns of an electrically conducting strap and is cooled by the flow of a cooling medium in ducts abutting or adjacent the edge of the strap. An armature is movably supported so that its coil reciprocates axially in the air gap. The armature also carries a table for supporting whatever device or other load is to be vibration tested. The armature coil is also preferably fluid cooled for example by winding the coil of a plurality of turns of a hollow conductor so that a cooling medium can be circulated therethrough. The field winding and armature coil are connected by means of conduits with an external supply of a suitable cooling medium, preferably a liquid, by means of a system of conduits which includes yieldable connections to the armature that do not interfere with the armature movement. To permit simulation of altitude and/or temperature conditions simultaneously with the vibration testing, an enclosure preferably insulated abuts the end of the shell opposite its head and is hermetically sealed with respect thereto. The abutting end of the enclosure is provided with an aperture to accommodate the armature test table so that the adjacent enclosure end acts as a baffle separating the chamber in the shell which holds the electrical and magnetic elements of the vibration generator that generate heat from the second chamber within the enclosure wherein the test load is mounted on the top of the armature table. Means are provided for evacuating the chambers to simulate high altitudes. The enclosure also is provided with a heat exchanger whereby temperature of the air remaining in the chambers can be lowered or raised as desired.

These and other objects and aspects of the invention will be apparent from the following description of several specific embodiments of the invention wherein:

FIG. 1 is an isometric view in partial section of an environmental test apparatus;

FIGS. 2 and 3 are side elevation views of the lower portion of the apparatus with the top portion removed;

FIG. 5 is a partial sectional view on line 5—5 of FIG. 4;

FIGS. 7 to 11 are fragmentary views showing several different flexible connections.

Figure 4:
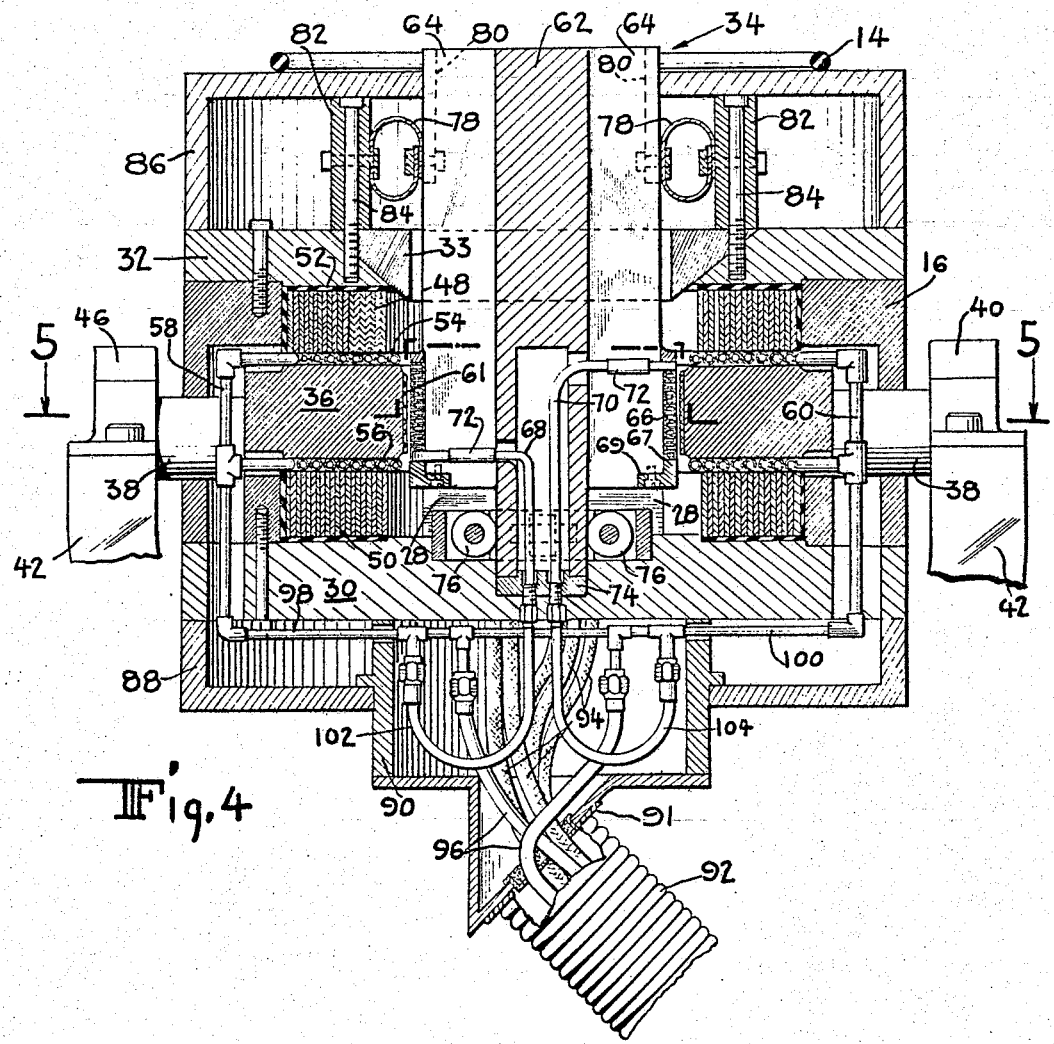
FIG. 4 is an enlarged sectional view on line 4—4 of FIG. 2.

As is best shown in FIG. 1, an environmental test apparatus according to our preferred embodiment comprises a vibration generator 10 to the top of which an insulated enclosure 12 is hermetically sealed by means of a gasket 14. The outer shell 16 of the vibration generator 10 and the enclosure 12 form a hermetically sealed housing which is divided into two chambers by the baffle 18 formed by the bottom of the enclosure. The two chambers are interconnected by an aperture through which a test load table 20 of the vibration generator 10 extends so that a device being tested (not shown) is enclosed within the upper chamber. The vibration generator electric and magnetic elements (described in detail below) which produce heating are located in the lower chamber. To simulate the pressure and temperatures encountered at high altitudes within the chambers so that a test load on the table 20 is subjected thereto, a vacuum pump 22 is provided to partially evacuate the chambers. The temperature of the air remaining in the upper chamber is controlled by a heat exchanger 24. When high altitude temperatures are being simulated a liquid cooled to the required temperature by a conventional refrigerating unit 26 is circulated through the heat exchanger 24. It will be evident, however, that if temperatures higher than ambient are required in the upper test chamber, hot water or steam can be circulated through the heat exchanger or a radiant heater employed.

The details of the vibration generator 10 are shown in FIGS. 4 and 5 wherein the magnetic circuit structure consists of a central pole piece which is formed of eight elongated sectors 28 having a generally triangular cross section. The sectors 28 are carried upon an end head 30 of the outer shell 16 and are symmetrically spaced about a common axis so as to form an equal member of outwardly extending slots. The opposite end of the shell 16 is also supplied with an end head 32 having a large central aperture partially closed by means of an annular wedge 33 which abuts the pole piece sectors 28 as will be described in detail hereinafter. A pole plate 36 is positioned midway between and parallel to the end heads 30 and 32 with its periphery in abutment with the inner surface of the outer shell 16. The pole plate 36 has a central aperture of a greater diameter than that of the pole piece so that the pole piece can extend therethrough an equal distance on either side of the pole plate. It will be evident from the above that if the polarity of field windings 48 and 50 is in opposed relationship the flow of flux in the magnetic circuit will follow two parallel paths consisting of the pole plate 36, the outer shell 16, one of the end heads 30 or 32 as the case may be, the pole piece sectors 28 and the air gap between the pole piece and the wall of the aperture in the pole plate.

The above described magnetic circuit elements are of a low reluctance material such as iron and are supported upon two trunnions 38 which project diammetrically from the outer periphery of the shell 16. The trunnions 38 are journaled in bearings 40 carried upon a fabricated frame 42 which is carried upon wheels 44 to permit movement of the vibration generator along rails 46 (FIGS. 2 and 3).

A unidirectional flux is established in the magnetic circuit and across the air gap by means of the two field windings 48 and 50 (FIG. 4) which encircle the pole piece upon opposite sides of the pole plate 36 in the chamber formed by the outer shell 16 and the end heads 30 and 32. Each of the field windings consists of a plurality of turns of a strap of an electrically conducting material, e.g., of copper or aluminum, whose face has a width at least several times the thickness of its edge. The strap is spirally wound with a layer of insulation between each of the turns which in the case of an aluminum strap may be anodizing. Interposed between the top side of the field winding 48 and the end head 32 is an insulating spacer 52. The bottom side of the field winding 48 is disposed adjacent a plurality of cooling passages or ducts 54 so that the edge of the conducting strap is separated therefrom only by the anodizing or other insulation barrier and a maximum heat transfer from the winding is obtained. Although the ducts 54 shown in FIG. 4 are in the form of a spirally wound tube, it is to be understood that the invention is not so limited and that the ducts can be formed in another manner, e.g., such as cored in a disc-like member or in the top surface of the pole plate 36 itself. In any case heat generated in the field winding 48 is readily transmitted transversely of the strap without encountering any thermal or insulating barriers until the edge of the strap is reached at which point only a single thin insulating layer is required. The field winding 50 is similarly provided with cooling ducts 56 which function in an analogous manner. The ducts 54 and 56 are connected in parallel by conduits 58 and 60 which serve to transmit a cooling medium, such as water, to and from the ducts as will be described hereinafter. It will be evident that ducts so arranged also serve to cool the pole plate 36 and a compensating winding in the form of a single copper ring 61 located in the plate air gap aperture.

The armature 34 comprises a central stem 62 having eight outwardly projecting webs 64 which are movably disposed in the corresponding slots between the sectors 28 of the pole piece. The top of the webs form the test load support or table 20. When very low operating temperatures are used, it has been found advantageous to interpose a thermal insulating block (not shown) between the table and the load. Towards the lower end of the armature 34 a coil 66 is formed of a plurality of turns of a hollow conductor is wound around the outer ends of the webs 64 so that the coil is positioned in the air gap in the magnetic circuit. The coil 66 is secured on the webs by an annular ring 67 held by screws which pass through inwardly projecting lugs 69. A cooling medium is introduced into and removed from the hollow conductor by conduits 68 and 70 which are brought in through recesses in the armature stem 62. Connections between the ends of the hollow conductor and the ends of the conduits 68 and 70 are made by means of rubber connectors 72 electrically to insulate the coil. The opposite ends of the conduits 68 and 70 are secured by a gland 74 inserted in the end of the armature stem 62.

One end of the armature coil 66 is grounded to one of the webs 64 which is in turn electrically connected to the magnetic circuit structure through the flexures 78. The other end of coil 66 is connected to a power lead 94 by a flexible lead (not shown). The other grounded power lead 94 is directly attached to the magnetic circuit structure.

The armature 34 is inserted in the chamber within the outer shell 16 by the removal of the annular wedge 33 mentioned heretofore. After the armature 34 is dropped into position with its webs 64 disposed in the slots between the pole piece sectors 28, the annular wedge 33 is again interposed between the end head 32 and the outer periphery of the sectors to minimize the interruption of the path of the magnetic flux. The lower web end of the armature 64 is restrained radially by four equally spaced rollers 76 which are mounted upon the bottom end head 30 so as to bear against the side of the stem 62. The upper end of the armature 34 is secured by four loop flexures 78 which are similar to the flexure described and claimed in the copending application for United States Letters Patent to Philip C. Efromson Serial No. 569,940, filed March 6, 1956. Each of the flexures 78 is bolted to a respective pad 80 formed integrally with the structure of the armature 34. The flexures 78 are also fastened to the corresponding sides of respective spacer blocks 82 which rest upon the top of the annular wedge 33. Both the spacer blocks 82 and the annular wedge 33 are held in position by bolts 84 which pass through aligned apertures therein to engage tapped recesses in the end head 32.

The spacer blocks 82 also support a fabricated upper end bell 86 which provides a lower bearing surface for the gasket 14. To prevent the loss of vacuum a lower end bell 88 is attached to the bottom of the outer shell 16. This end bell 88 is provided with a connection box 90 which in turn is attached by a suitable flange 91 one end of a hollow flexible tube 92. The flanged end of the flexible tube 92 is hermetically sealed and the electrical leads 94 to the field windings 48 and 50 and the armature coil 66 and the hoses 96 for the cooling medium are brought through such seal from the connection box 90 so that the vibration generator can be moved on the wheels 44 without the necessity of breaking either the vacuum seal or the electrical leads and cooling medium connections.

Figure 6:
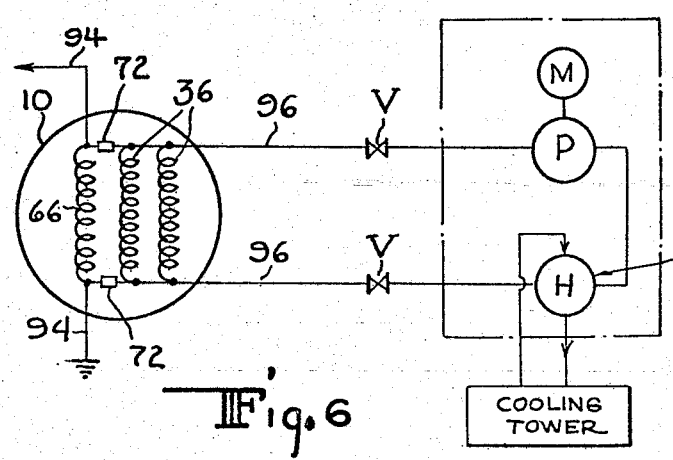
FIG. 6 is a schematic view showing the cooling liquid conduits and connections.

In the connection box 90 the hoses 96 are connected with the horizontal manifolds 98 and 100 whose ends are joined respectively to the conduits 58 and 60 leading to the field winding cooling ducts 54 and 56. The manifolds 98 and 100 are also connected with the ends of the armature conduits 68 and 70 by yieldable connections 102 and 104 which do not interfere with the axial movement of the armature 34. As is shown in FIG. 6, the opposite ends of the hoses 96 are connected by valves V in series with a motor driven pump P and a heat exchanger H.

In the embodiment shown in FIG. 4 the yieldable connections consist of two flexible hoses each of which has a 180 degree bight that rolls as the armature 34 moves. In FIGS. 7 to 11 are shown other types of yieldable connections permitting the substitution of a simple electrical connection plate or panel for the connection box such as 90. Without the connection box 90, the central aperture in the bottom end head 30 is eliminated as in the end head 130 in FIG. 7 which is solid except for two small holes 131 that have the same spacing as the armature conduits 68 and 70. Each of the yieldable connections in the embodiment of FIG. 7 is completed by means of several turns of metal tubing 102a (or 102b) which is in the form of a large diameter helical spring. The upper ends of the helically formed tubing 102a and 102b are attached to the gland 74 at the lower end of the armature stem 62 by any of the well known conventional tubing coupling nuts. The lower ends of the tubing 102a and 102b are similarly coupled with the holes 131 in the end head 130. The outer ends of the holes 131 are in turn connected to hoses such as 96 (FIG. 4) leading to the supply of cooling medium by similar coupling nuts (not shown). It will be evident that by substituting a second set of rollers, similar to the rollers 76, for the loop flexures 78, an alternate embodiment is obtained wherein the large helical springs formed by the turns of the tubing 102a and 102b form the entire spring restraint necessary for control of the armature motion.

Another embodiment is shown in FIG. 8 wherein the yieldable connections are not dependent upon the deflection or deformation of the tubing. The lower ends of two lengths of straight tubing 202a and 202b are brazed or welded in the holes 131 in the head 130. The other ends of the tubing 202a and 202b project into recesses 203 (only one of which is shown) in the bottom of a modified armature stem 262. As is illustrated in connection with the tubing 202a, the recess 203 is of larger diameter than the tubing to permit two spaced encircling seals 205 to be interposed therebetween. The upper end of the tubing 202a is capped and an aperture provided in its side wall between the two seals 205 so that the cooling medium can be introduced into the space between the seals. The cooling medium is led from this space by a passageway 268 in the stem 262 which in turn connects with the conduit 68. Similar seals and connections are provided for the tubing 202b. It will be evident that the yielding is this connection provided by the movement of the tubings 202a and 202b in the seals 205 as the armature 34 reciprocates.

An alternate form of yieldable connection is illustrated in FIG. 9 wherein a straight tubing 302a extends radially from the armature stem 362 perpendicular to the direction of armature movement is engaged by an encircling type of seal such as an O-ring or a metal enclosed shaft seal wherein a garter spring presses a sharp lip against the tubing. The stem end of the tubing 302a is connected with a passageway 368 in the armature stem 362 by an encircling seal 305. The other end of the tubing 302a is connected by a similar seal 305 with a passageway which extends radially outwardly through the end head 330 to connect with a cooling medium supply hose 96. The yielding in this connection is obtained by the pivoting of the ends of the tubing 302a to permit tilting of the tubing as the armature stem 362 moves.

A somewhat similarly arranged yieldable connection is shown in FIG. 10 wherein the rigid tubing and encircling seal of the embodiment of FIG. 9 are replaced by a flexible hose 402a, consisting of a helical spring enclosing a rubber liner, which extends between the armature stem 462 and the end head 430. Such a flexible hose may also be bent in an arc of 180 degrees and mounted as at 502a by suitable modification of the armature stem 562 and end head 530 as shown in FIG. 11. In the latter modification the hose 502a rolls in a manner similar to that described above with reference to connections 102 and 104 of FIG. 4.

It will be evident that an environmental test apparatus according to that described above has the following distinct advantages:

(1) The test chamber need only be large enough to received the test specimen thereby minimizing the space which must be evacuated.

(2) No seals which interfere with the free movement of the armature are required.

(3) The test chamber sealing is simply and positively accomplished so that the test setup can be readily changed.

(4) No free cooling liquid or vapor are present in either the test chamber or the vibration generator to contaminate the atmosphere or interfere with the armature movement.

(5) Water can be used as the cooling medium.

It should be understood that the present disclosure is for the purpose of illustration only and that this invention includes all modifications and equivalents which fall within the scope of the appended claims.

I claim:

1. Electrodynamic vibration test apparatus for imparting a reciprocating motion to a load comprising a magnetic core structure having an air gap therein, a direct current field winding a plurality of turns for establishing a unidirectional magnetic flux across the air gap, means including ducts for conducting a cooling medium past the winding turns to extract the heat therefrom, an armature movably supported with respect to the core structure and having an alternating current coil located in the air gap, the armature coil including a plurality of turns wound of a hollow electrical conductor, and conduit means including connections to the armature for circulating a cooling medium through the hollow conductor to conduct the heat from the armature said connections including yieldable portions disposed adjacent the armature to permit reciprocal movement thereof relative to the core structure.

2. Electrodynamic vibration test apparatus for imparting a reciprocating motion to a load comprising a magnetic core structure having an air gap therein, a direct current field winding including a plurality of turns for establishing a unidirectional magnetic flux across the air gap, means including ducts for conducting a cooling medium past the winding turns to extract the heat therefrom, an armature movably supported with respect to the core structure and having an alternating current coil located in the air gap, the armature coil including a plurality of turns wound of a hollow electrical conductor, and conduit means for connecting with the armature to couple the ends of the hollow conductor with a supply of a cooling medium to circulate the medium therethrough, the portions of the conduit means adjacent the armature including yieldable connections which do not substantially interfere with the movement of the armature.

3. Electrodynamic vibration test apparatus for imparting a reciprocating motion to a load comprising a magnetic core structure having an air gap therein, a direct current field winding including a plurality of turns for establishing a unidirectional magnetic flux across the air gap, means including ducts for conducting a cooling medium past the winding turns to extract the heat therefrom, an armature movably supported with respect to the core structure and having an alternating current coil located in the air gap, the armature coil including a plurality of turns wound of a hollow electrical conductor, and conduit means including two portions extending between the core structure and the armature to connect the respective ends of the hollow conductor with a supply of a cooling medium to circulate the medium therethrough, each portion of the conduit means adjacent the armature including an encircling seal which is interposed between the periphery of said portion and the armature to form a yieldable connection which does not substantially interfere with the movement of the armature.

4. Electrodynamic vibration test apparatus for imparting a reciprocating motion to a load comprising a magnetic core structure having an air gap therein, a direct current field winding including a plurality of turns for establishing a unidirectional magnetic flux across the air gap, means including ducts for conducting a cooling medium past the winding turns to extract the heat therefrom, an armature movably supported with respect to the core structure and having an alternating current coil located in the air gap, the armature coil including a plurality of turns wound of a hollow electrical conductor, and conduit means including two rigid portions which extend between the core structure and the armature transversely to the axis thereof to connect the respective ends of the hollow conductor with a supply of a cooling medium to circulate the medium therethrough, the opposite ends of each rigid portion having encircling seals interposed between the periphery of each of its ends and the armature and core structure respectively to form yieldable connections which permit the rigid portions to tilt as the armature moves so as not to interfere with the movement thereof.

5. Electrodynamic vibration test apparatus for imparting a reciprocating motion to a load comprising a magnetic core structure having an air gap therein, a direct current field winding including a plurality of turns for establishing a unidirectional magnetic flux across the air gap, means including ducts for conducting a cooling medium past the winding turns to extract the heat therefrom, an armature movably supported with respect to the core structure and having an alternating current coil located in the air gap, the armature coil including a plurality of turns wound of a hollow electrical conductor, and conduit means including two rigid portions which extend between the core structure and the armature substantially parallel to the axis thereof to connect the respective ends of the hollow conductor with a supply of a cooling medium to circulate the medium therethrough, one end of each rigid portion having an aperture through the wall thereof and an encircling seal on either side of the aperture, the other end of the rigid portion being fixed to permit relative axial movement between the rigid portion and the seal to form yieldable connections which do not interfere with the movement of the armature.

6. Electrodynamic vibration test apparatus for imparting a reciprocating motion to a load comprising a magnetic core structure having an air gap therein, a direct current field winding including a plurality of turns for establishing a unidirectional magnetic flux across the air gap, means including ducts for conducting a cooling medium past the winding turns to extract the heat therefrom, an armature movably supported with respect to the core structure and having an alternating current coil located in the air gap, the armature coil including a plurality of turns wound of a hollow electrical conductor, and conduit means including two flexible portions which extend between the core structure and the armature to connect the respective ends of the hollow conductor with a supply of a cooling medium to circulate the medium therethrough, each of the flexible portions being arranged as a 180 degree bight to form a yieldable connection which does not interfere with the movement of the armature.

7. Electrodynamic vibration test apparatus for imparting a reciprocating motion to a load comprising a magnetic core structure having an air gap therein, a direct current field winding including a plurality of turns for establishing a unidirectional magnetic flux across the air gap, means including ducts for conducting a cooling medium past the winding turns to extract the heat therefrom, an armature movably supported with respect to the core structure and having an alternating current coil located in the air gap, the armature coil including a plurality of turns wound of a hollow electrical conductor, and conduit means including two flexible portions which extend between the core structure and the armature to connect the respective ends of the hollow conductor with a supply of a cooling medium to circulate the medium therethrough, each of the flexible portions having one or more convolutions to form a yieldable connection which does not interfere with the movement of the armature.

8. Electrodynamic vibration test apparatus for imparting a reciprocating motion to a load comprising a magnetic core structure having an air gap therein, a direct current field winding for establishing a unidirectional magnetic flux across the air gap, the field winding being formed of a spirally wound electrically conducting strap the width of whose face is at least several times its thickness, means including ducts for conducting a cooling medium past the side edge of the strap to extract the heat therefrom, an armature movably supported with respect to the core structure and having an alternating current coil located in the air gap, the armature coil including a plurality of turns wound of a hollow electrical conductor, and conduit means including yieldable connections for circulating a cooling medium through the hollow conductor to conduct the heat from the armature.

9. Electrodynamic vibration test apparatus for imparting a reciprocating motion to a load comprising a magnetic core structure having a central pole piece forming one face of an air gap, a direct current field winding mounted in the core structure in coaxial relationship to the pole piece for establishing a unidirectional magnetic flux across the air gap, the field winding being formed of a spirally wound electrically conducting strap the width of whose face is at least several times its thickness, means including arcuate ducts arranged coaxially with respect to the pole piece and abutting the side edge of the strap for conducting a cooling medium past said side edge to extract the heat from the winding, an armature movably supported with respect to the core structure and having an alternating current coil located in the air gap, the armature coil including a plurality of turns wound of a hollow electrical conductor, and conduit means including yieldable connections for circulating a cooling medium through the hollow conductor to conduct the heat from the armature.

10. Electrodynamic vibration test apparatus for imparting a reciprocating motion to a load comprising a magnetic core structure including a pole plate having an aperture therein and a central pole piece extending into the aperture to form an air gap, a direct current field winding encircling the pole piece adjacent the plate for establishing a unidirectional magnetic flux across the air gap, the field winding being formed of a spirally wound electrically conducting strap the width of whose face is at least several times its thickness, means including ducts interposed between the plate and the side edge of the strap for conducting a cooling medium past said side edge to extract the heat therefrom, an armature movably supported with respect to the core structure and having an alternating current coil located in the air gap, the armature coil including a plurality of turns wound of a hollow electrical conductor, and conduit means including yieldable connections for circulating a cooling medium through the hollow conductor to conduct the heat from the armature.

11. Electrodynamic vibration test apparatus for imparting a reciprocating motion to a load comprising a magnetic core structure including a pole plate having an aperture therein, and a central pole piece extending into the aperture to form an air gap, a direct current field winding encircling the pole piece adjacent the plate for establishing a unidirectional magnetic flux across the air gap, the field winding being formed of a spirally wound electrically conducting strap the width of whose face is at least several times its thickness, means including arcuate ducts arranged coaxially with respect to the pole piece and abutting the side edge of the strap for conducting a cooling medium past said side edge to extract the heat from the winding, an armature movably supported with respect to the core structure and having an alternating current coil located in the air gap, the armature coil including a plurality of turns wound of a hollow electrical conductor, and conduit means including yieldable connections for circulating a cooling medium through the hollow conductor to conduct the heat from the armature.

12. Electrodynamic vibration test apparatus for imparting a reciprocating motion to a load comprising a magnetic core structure including a pole plate having a circular aperture therein, a central pole piece coaxially extending through the aperture a substantially equal distance from the opposite sides of the pole piece to form a cylindrical air gap and a cylindrical shell having end heads for interconnecting the pole plate with the respective ends of the pole piece to complete the magnetic circuit, two direct current field windings encircling the central pole piece on opposite sides of the pole plate for establishing a unidirectional magnetic flux across the air gap, each field winding being formed of a spirally wound electrically conducting strap the width of whose face is at least several times its thickness, means including ducts interposed between the plate and the side edges of the respective straps for conducting a cooling medium past the side edges of the straps to extract the heat therefrom, an armature movably supported with respect to the core structure and having an alternating current coil located in the air gap, the armature coil including a plurality of turns wound of a hollow electrical conductor, and conduit means including yieldable connections for circulating a cooling medium through the hollow conductor to conduct the heat from the armature.

13. Electrodynamic vibration test apparatus for imparting a reciprocating motion to a load comprising a magnetic core including a pole plate having a circular aperture therein, a central pole piece coaxially extending through the aperture a substantially equal distance from the opposite sides of the pole piece to form a cylindrical air gap and a cylindrical shell having end heads for interconnecting the pole plate with the respective ends of the pole piece to complete the magnetic circuit, two direct current field windings encircling the pole piece on opposite sides of the pole plate for establishing a unidirectional magnetic flux across the air gap, each field winding being formed of a spirally wound electrically conducting strap the width of whose face is at least several times its thickness, means including two sets of arcuate ducts arranged coaxially with respect to the pole piece and abutting the side edges of the respective straps for conducting a cooling medium past said strap side edges to extract the heat from the corresponding windings, an armature movably supported with respect to the core structure and having an alternating current coil located in the air gap, the armature coil including a plurality of turns wound of a hollow electrical conductor, and conduit means including yieldable connections for circulating a cooling medium through the hollow conductor to conduct the heat from the armature.

14. Environment testing apparatus comprising a substantially hermetically sealed housing including an intermediate transverse baffle with an aperture therein, the baffle being positioned to divide the housing into two interconnected chambers, a vacuum producing means for reducing the pressure of the air in the chambers below that of the ambient atmosphere, temperature control means for varying the temperature of the air remaining in the chambers, a test table movably disposed in the baffle aperture for supporting a test load within one of the chambers, and electromagnetic means located in the other chamber for imparting a reciprocating movement to the table, said electromagnetic means including a magnetic circuit having an air gap, a portion of which magnetic circuit is formed by the housing, a direct current field winding associated with the magnetic circuit for establishing a unidirectional magnetic flux across the air gap, enclosed ducts abutting the winding for bringing a cooling medium into a thermal relationship therewith, an alternating current coil whose turns are formed from a hollow tube, said coil being positioned in the air gap and mechanically interconnected with the test table, and conduit means for supplying a cooling medium from an external source to the enclosed ducts and hollow tube thereby to extract the heat generated in the field winding and the coil by the flow of electric current therethrough, the portions of the conduit means adjacent the coil having yieldable connections so as not to interfere with the movement of the coil and table.

15. Environment testing apparatus comprising a substantially hermetically sealed housing including an intermediate baffle with an aperture, the baffle being positioned to divide the housing into two interconnected chambers, the housing having a separable joint adjacent the baffle to permit separation of the chambers, vacuum producing means for reducing the pressure of the air in the chambers below that of the ambient atmosphere, temperature control means for varying the temperature of the air remaining in the chambers, a test table movably disposed in the baffle aperture for supporting a test load within one of the chambers, and electromagnetic means located in the other chamber for imparting a reciprocating movement to the table, said electromagnetic means including a magnetic circuit having an air gap, a portion of which magnetic circuit is formed by a portion of the outer wall of the housing, a direct current field winding associated with the magnetic circuit for establishing a unidirectional magnetic flux across the air gap, enclosed ducts abutting the winding for bringing a cooling medium into a thermal relationship therewith, an alternating current coil whose turns are formed from a hollow tube, said coil being positioned in the air gap and mechanically interconnected with the test table, and conduit means for supplying a cooling medium from an external source to the enclosed ducts and hollow tube thereby to extract the heat generated in the field winding and the coil by the flow of electric current therethrough, the portions of the conduit means adjacent the coil having yieldable connections so as not to interfere with the movement of the coil and table.

16. Environment testing apparatus comprising a vibration generator including a magnetic core structure having an outer cylindrical shell with an end head closing one end thereof to form a first chamber, a central pole piece carried by the end head in coaxial relationship with respect to the shell, and a pole plate abutting the inner surface of the shell and having an aperture whose wall encircles the pole piece and is spaced therefrom to form an air gap in the magnetic circuit, a field winding including a plurality of turns located in the first chamber for establishing a unidirectional magnetic flux across the air gap, means including ducts disposed adjacent the winding turns for conducting a cooling medium thereby, an armature supported to move axially with respect to the core structure, the armature including a coil wound of a hollow electrical conductor located in the air gap and a test load table connected therewith, an enclosure removably engaging the end of the shell opposite the end head to form a second chamber, the portion of the enclosure adjacent the shell having an opening surrounding the test load table and interconnecting the first and second chamber, means for hermetically sealing between the shell and the enclosure, means for evacuating the chambers, and conduit means including yieldable connections for conducting cooling medium from an external supply to the field winding ducts and armature coil conductor.

17. Environment testing apparatus comprising a vibration generator including a magnetic core structure having an outer cylindrical shell with an end head closing one end thereof to form a first chamber, a central pole piece carried by the end head in coaxial relationship with respect to the shell, and a pole plate abutting the inner surface of the shell and having an aperture whose wall encircles the pole piece and is spaced therefrom to form an air gap in the magnetic circuit, a field winding including a plurality of turns located in the first chamber for establishing a unidirectional magnetic flux across the air gap, the field winding being formed of a spirally wound electrically conducting strap the width of whose face is at least several times its thickness, means including arcuate ducts arranged coaxially with respect to the pole piece and abutting the end of the strap for conducting a cooling medium past said end to extract the heat from the winding, an armature supported to move axially with respect to the core structure, the armature including a coil wound of a hollow electrical conductor located in the air gap and a test load table connected therewith, an enclosure removably engaging the end of the shell opposite the end head to form a second chamber, the portion of the enclosure adjacent the shell having an opening surrounding the test load table and interconnecting the first and second chamber, means for hermetically sealing between the shell and the enclosure, means for evacuating the chambers, and conduit means including yieldable connections for conducting cooling medium from an external supply to the field winding ducts and armature coil conductor.

18. Environment testing apparatus comprising a vibration generator including a magnetic core structure having an outer cylindrical shell with an end head closing one end thereof to form a first chamber, a central pole piece carried by the end head in coaxial relationship with respect to the shell, and a pole plate abutting the inner surface of the shell and having a central aperture therein, the pole piece extending through the aperture a substantially equal distance from the opposite sides of the pole piece to form an air gap in the magnetic circuit, a field winding including a plurality of turns located in the first chamber for establishing a unidirectional magnetic flux across the air gap, the field winding being formed of a spirally wound electrically conducting strap the width of whose face is at least several times its thickness, means including arcuate ducts arranged coaxially with respect to the pole piece and abutting the end of the strap for conducting a cooling medium past said end to extract the heat from the winding, an armature supported to move axially with respect to the core structure, the armature including a coil wound of a hollow electrical conductor located in the air gap and a test load table connected therewith, an enclosure removably engaging the end of the shell opposite the end head to form a second chamber, the portion of the enclosure adjacent the shell having an opening surrounding the test load table and interconnecting the first and second chamber, means for hermetically sealing between the shell and the enclosure, means for evacuating the chambers, and conduit means including yieldable connections for conducting cooling medium from an external supply to the field winding ducts and armature coil conductor.

References Cited in the file of this patent

UNITED STATES PATENTS

| | | |
|---|---|---|
| 2,278,241 | Case | Mar. 31, 1942 |
| 2,289,962 | Hancock | July 14, 1942 |
| 2,599,036 | Efromson et al. | June 3, 1952 |
| 2,705,761 | Unholtz | Apr. 5, 1955 |
| 2,820,159 | Reen et al. | Jan. 14, 1958 |
| 2,853,667 | Booth et al. | Sept. 23, 1958 |
| 2,866,952 | Wadhams | Dec. 30, 1958 |

OTHER REFERENCES

"Vibration Testing 24 Miles Above Sea Level" by Donald S. McCluskey. MB Vibration Notebook, vol. 2, No. 1, published by MB Manufacturing Co., 1060 State Street, New Haven, Conn. (Copy in 73–71.6.)